CONTROL DEVICES EMPLOYING MAGNETOSTRICTIVE MATERIALS

Filed March 21, 1966 4 Sheets-Sheet 1

INVENTOR.
ALEXANDER NYMAN
BY Francis J. Thomas
ATTORNEY

CONTROL DEVICES EMPLOYING MAGNETOSTRICTIVE MATERIALS

Filed March 21, 1966 4 Sheets-Sheet 2

Aug. 5, 1969 A. NYMAN 3,459,126

CONTROL DEVICES EMPLOYING MAGNETOSTRICTIVE MATERIALS

Filed March 21, 1966 4 Sheets-Sheet 3

3,459,126
Patented Aug. 5, 1969

3,459,126

CONTROL DEVICES EMPLOYING MAGNETOSTRICTIVE MATERIALS

Alexander Nyman, Dover, Mass., assignor, by mesne assignments, to Mohawk Data Science Corporation, East Herkimer, N.Y., a corporation of New York Filed Mar. 21, 1966, Ser. No. 536,035
Int. Cl. B41j *29/48;* H01h *47/00*
U.S. Cl. 101—93 13 Claims

ABSTRACT OF THE DISCLOSURE

A magnetostrictive actuating mechanism utilizes a disk-shaped element including two layers of magnetostrictive material, each layer having a different coefficient of magnetostrictive expansion. The disk is prestressed into convex curvature and when a magnetic field is applied it is magnetostrictively transferred through a planar state to a concave state where it remains against the prestress bias until the field is removed, at which time it snaps back to its convex shape. The actuator is adapted for use in operating print hammers.

This invention relates to electro-mechanical switching devices employing magnetostrictive elements and, in particular, to devices of this type which are used to control hammers in printing machines.

Magnetostrictive action is a well known phenomenon in certain ferromagnetic materials, as described in a text entitled Ferromagnetism by Richard M. Bozorth, published by D. Van Nostrand Co., Inc., 1951. Various materials have a magnetostrictive coefficient of expansion (or contraction); that is, the dimensions of the materials are altered when they are placed in a magnetic field.

The magnetostrictive principle is applied to provide mechanical displacements which can be used to control various mechanisms as, for example, relays or valves. The invention is preferably embodied in the control device for the hammers in a printing machine. The magnetostrictive element is flexibly mounted for movement when a force is applied. The element is arranged to provide an increasing resistance when moved by an applied force until the displacement exceeds a predetermined threshold. At this point, the force-displacement relationship undergoes a negative resistance region and the displacement rapidly increases without increasing the applied force. One such configuration having these properties is a disk mounted along its circumference under inward radial pressure which causes the surface of the disk to be rounded (similar to the bottom of an oil can). As pressure is applied against the convex surface of the disk (in the analogy, to the outside of the bottom of the oil can), the disk moves towards a flattened position. As further pressure is applied, the disk snaps past its flattened position and assumes a concave position. This position can be maintained with only a slight force and removal of the force returns the disk to its quiescent (convex) position. Thus, the force-displacement relationship is positive up to the time that the disk is flattened and is thereafter followed by a negative-resistance relationship where further displacement takes place, even if the force is decreased considerably.

In the present invention, a disk of magnetostrictive material is pressure-mounted on a circumferential frame such that the surface of the disk is curved. A magnetic field is then applied which alters the dimensions of the material, causing the above-described effect. In the preferred embodiment of the invention, a bimetallic disk is employed, where the metal forming the concave side of the disk has a positive magnetostrictive coefficient of expansion and the other metal has a negative magnetostrictive coefficient of expansion. Suitable materials having positive coefficients are permalloy and cobalt-iron compounds. A negative coefficient is suitably provided by nickel. Thus, the magnetic field causes the center of the disk to move until the disk is flat, and then the disk rapidly snaps to a curved configuration opposite to its original (quiescent) configuration. When the magnetic field is removed, the disk snaps back to its quiescent configuration. In the invention, the movement of the center of the disk is used to control the hammers of a printing machine, but this movement is also useful to operate electrical contacts to form a relay or to control a valve or other mechanism requiring a mechanical movement. Several disks can be arranged in tandem to provide increased mechanical movement, if desirable.

In the preferred embodiment of the invention, the disk is arranged to return to its quiescent state upon removal of the magnetic field. Obviously the disk can be mounted so that it remains in its activated position after the magnetic field is removed but, in this case, an additional resetting mechanism is ordinarily required. Such a device would be useful as the control mechanism for a manually reset alarm system or in any application where automatic resetting is undesirable. When used to control hammers in a printing machine, this type of device can be reset by the rebounding hammer after printing.

As a further modification of the invention, two of the inventive control devices can be arranged face-to-face so that activation of each device resets the other device. The resulting mechanism has two stable states and can be used as a binary storage element in a calculating machine.

It is thus an object of the present invention to provide an improved switch employing magnetostrictive action.

Another object is to provide a switch employing a magnetostrictive element that is displaceably mounted for movement from a quiescent position through positions attainable by the application of relatively high forces to a position maintainable in the presence of a relatively low force or no force.

A further object is to provide a switch employing a magnetostrictive element that is mounted for forcible displacement from a position of quiescent equilibrium to another position, where the force-displacement relationship has a negative resistance between the positions.

Another object is to provide a switch employing a bimetallic magnetostrictive element where one metal has a positive magnetostrictive coefficient of expansion, such as permalloy or a cobalt-iron compound, and the other metal has a negative magnetostrictive coefficient of expansion, such as nickel.

A further object of the present invention is to provide a control mechanism for hammers in a printing machine, wherein the control mechanism employs magnetostrictive elements.

The foregoing and other objects, features and advantages of the invention will be apparent from the following more particular description of preferred embodiments of the invention, as illustrated in the accompanying drawings.

Figure 1:
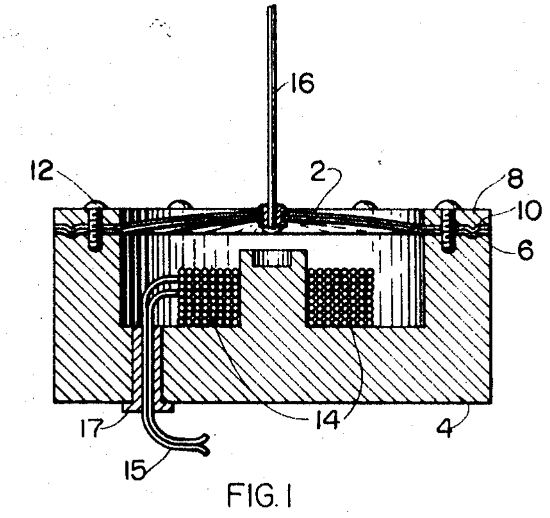
FIGURES 1 and 2 are cross-sectional views of a preferred embodiment of a magnetostrictively-controlled switch showing its two states of operation.
Figure 2:
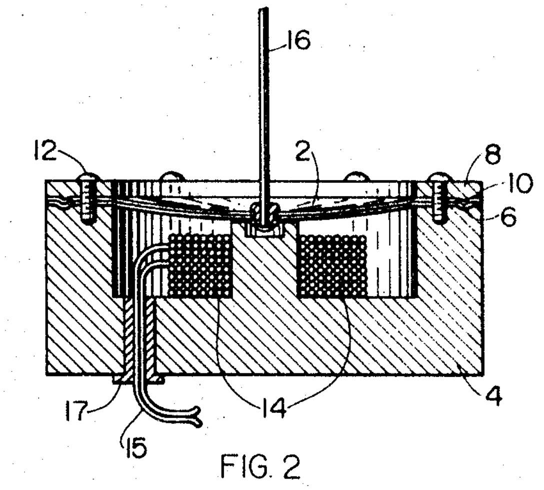

As shown in FIGS. 1 and 2, a bimetallic disk of material 2 is circumferentially mounted in a cylindrical enclosure 4 of ferrous material, such as iron or steel. The lower disk material has a positive magnetostrictive coefficient of expansion, such as permalloy or another nickel-iron compound, or a cobalt-iron compound; and the upper disk material has a negative magnetostrictive coefficient of expansion, such as nickel or a nickel-iron compound having less than 10% iron. The characteristics of these materials are described in the above-cited Bozorth reference. The disk is mounted under inward radial pressure such that its center portion is quiescently curved upward as shown in FIGURE 1. The edge of the disk contains a preformed bend which cooperates with a groove 6 in the enclosure to insure that the disk is mounted with the desired inward radial force. A ring-shaped element 8 containing a ridge 10 (which is shaped to conform to the groove 6) is attached to the enclosure 4 by screws 12 to clamp the disk in its quiescent position. A magnetic field is introduced in the region of the disk 2 by applying current to a coil 14 through leads 15 which enter the enclosure through a grommet 17. When current is applied, a magnetic field is established by way of the iron enclosure 4 to the disk 2 causing the upper layer of the disk to contract and the lower layer to expand. The center of the disk snaps to the position shown in FIG. 2 when sufficient force is developed in the disk by the magnetic field. When current is removed from coil 14, the disk returns to its quiescent position as shown in FIG. 1. The motion developed by the disk is transmitted by a wire 16 which is connected to the center of the disk. The connection is shown in greater detail in FIG. 3 where a brass grommet 18 inserted into a hole in the disk 2 is compressionally distorted in shape to form a hollow rivet. The connecting rod 16, which is preferably made of steel, is inserted through the hole in the grommet and then soldered to the grommet.

Figures 3, 4:
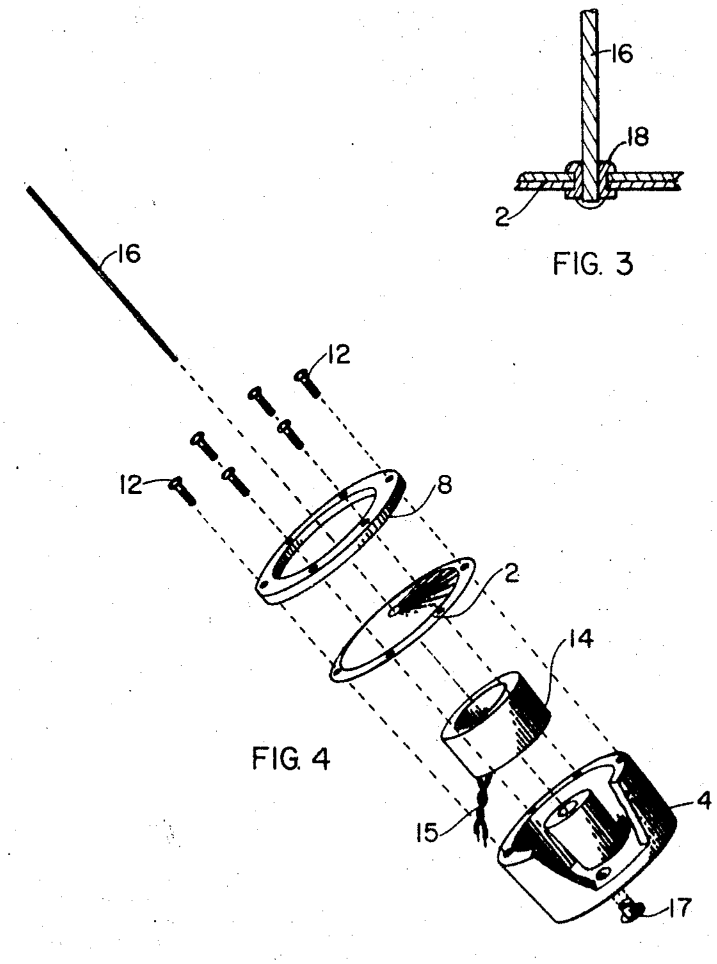
FIGURE 3 is a detailed cross-sectional view of a portion of the device shown in FIGS. 1 and 2.
FIGURE 4 is an exploded view of the device shown in FIGS. 1, 2 and 3.

The assembly of the device shown in FIGS. 1, 2 and 3 is illustrated in detail in FIG. 4.

Obviously the disk 2 also can be mounted for quiescent operation as shown in FIG. 2 and for activated operation as shown in FIG. 1. In this case, the disk is reversed so that the lower material has a negative magnetostrictive coefficient of expansion and the upper material has a positive coefficient of expansion.

The edges of the disk are firmly clamped to introduce radical compressive forces. The magnetostrictive forces extend the concave side and contract the convex side. The resulting forces are in proportion to linear distortion and to the thickness of the disk. The shape of the disk is determined by effective extension and contraction to be explained in the following calculations. When the linear change is sufficient to flatten the disk, the negative axial force snaps the disk into its opposite condition with the expanded side convex and the contracted side concave.

In the preferred embodiment of the invention as shown in FIGS. 1–4, the following materials and parameters are used. Disk materials: bimetallic comprised of a layer of nickel and a layer of permalloy, which provide magnetostrictive coefficients of expansion of $-25\times10^{-6}$ and $+25\times10^{-6}$, respectively, in a magnetic field of 200 oersteds. Disk diameter 1″. The displacement calculation presumes the initial bulge to be a spherical segment which subtends an angle $2\theta$, a radius of curvature R when bulged, and a disk surface diameter of $e-\delta e$ when flat and $e$ when bulged, then:

$$e-\delta e=2R\sin\theta \text{ and } e=2R\theta$$

$$\delta e=2R(\theta-\sin\theta)$$

$$\frac{\delta e}{e}=\frac{\theta-\sin\theta}{\theta}=1-\frac{\sin\theta}{\theta}$$

$$\frac{\delta e}{e}=1-\frac{1}{\theta}\left[\theta-\frac{\theta^3}{3!}+\frac{\theta^5}{5!}+\dots\right]$$

$$\frac{\delta e}{e}=\frac{\theta^2}{6}-\frac{\theta^4}{120}+\dots$$

Since the angle $\theta$ is very small $\delta e/e=\theta^2 6$ is approximately accurate. Thus, $$\theta=\sqrt{\frac{6\times\delta e}{e}}$$

$\delta e/e$ describes the difference of expansion of the materials used; $\delta e/e-50\times10^{-6}$ at 200 oersteds. Therefore $$\theta=\sqrt{6\times50\times10^{-6}}=.0173 \text{ radians}$$

Since $e=2R\theta$ $$R=\frac{e}{2\theta}=\frac{1}{2\times.0173}=28.8''$$

The axial displacement is expressed as $$A=R(1-\cos\theta)=2R\sin^2\theta/2=2R(\theta/2)^2$$

for small values of $\theta$. This gives the axial displacement $$A=2\times28.8\ (.0173/2)^2=.0043''$$

It should be noted that the calculation is independent of the thickness of the disk.

Figure 5:
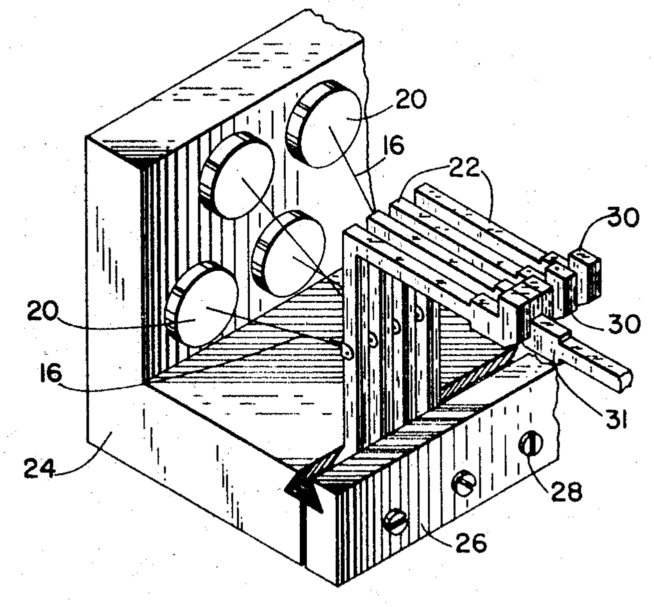
FIGURES 5 and 6 are perspective views of two embodiments of hammer mechanisms for use in printing machines, where the hammers are controlled by devices of the type shown in FIGS. 1, 2 and 3.
Figure 6:
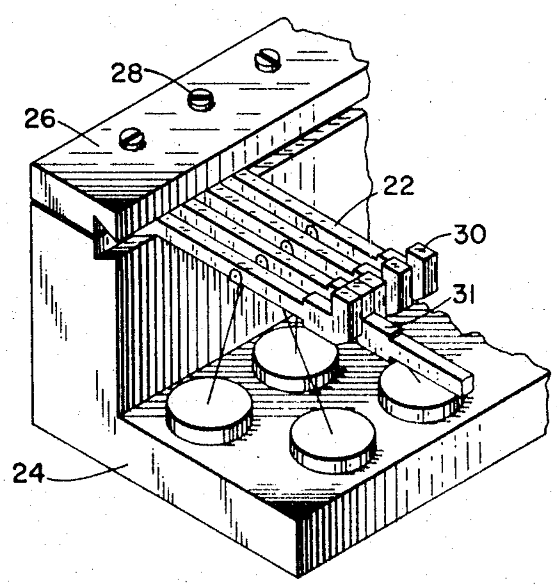

While the inventive device has many uses, a group of these devices is employed to activate hammers in a printing machine as shown in FIGS. 5 and 6. In FIG. 5, a magnetostrictive control device 20 of the type shown in FIGS. 1–4 is employed to control each of a group of hammer arms 22. One end of each hammer arm is rigidly mounted in a frame 24 by a mounting plate 26 which is affxed to the frame by means of screws 28. The other end of the arm 22 contains a hammer 30. The hammer arms are made of resilient steel and are mounted in a frame so that the hammers are quiescently in de-activated (downward) positions. In this embodiment, the magnetostrictive control devices are momentarily activated causing the wires 16 to pull the hammers into their printing positions. Alternatively, the control devices can be reversed so that the hammers are actuated by momentarily removing current to the control devices.

Another use of the magnetostrictive control devices is shown in FIG. 6 where the hammers are rigidly mounted and biased toward their printing position. In this embodiment, the control devices 20 normally flex the hammer arms in the non-printing (downward) direction and printing is accomplished by momentarily releasing the current in the control device to permit the hammers to spring upward. As an alternative to the embodiment shown in FIG. 6, the control devices can be fabricated such that their quiescent position is as shown in FIG. 2 and an activated position as shown in FIG. 1. In this case, the control elements in FIG. 6 hold the hammers under tension and release them for upward movement when current is applied to the magnetizing coil 14 (FIGS. 1 and 2).

In both FIGURES 5 and 6, the hammers 30 are spaced apart and alternate hammers 31 are mounted on similar units that are not shown. As a result, a closely-spaced row of hammers is achieved while permitting the control units to be spread out.

Figure 7:
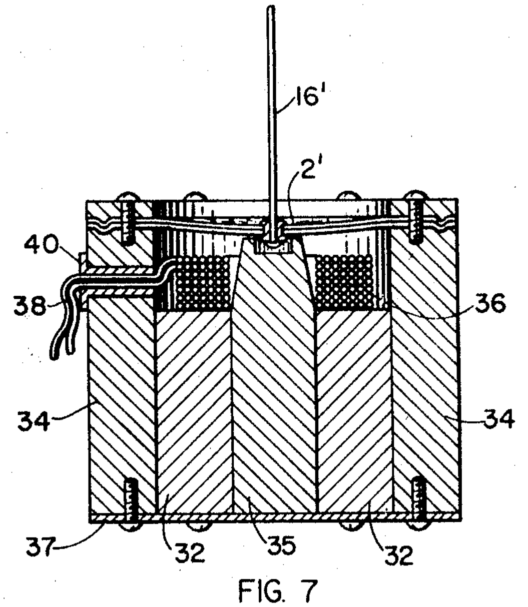
FIGURES 7 and 8 are cross-sectional views of two additional embodiments of the invention, both said embodiments utilizing permanent magnets in conjunction with electromagnetic coils to generate the magnetostrictive effects.

Another embodiment of the invention is shown in FIG. 7. In this embodiment, stronger magnetic fields are made possible by the use of a strong, ring-shaped permanent magnet 32 having radial magnetization and located between iron pole pieces 34 and 35. The assembly is mounted on a base 37 of non-ferrous material. The permanent magnet provides a field which is strong enough to activate the disk 2' of the magnetostrictive materials.

In this embodiment, the disk is distorted to its downward position by the permanent magnet. A de-magnetizing coil 36 is used providing a magnetic field in opposition to the field of the permanent magnet. When current is applied to the de-magnetizing coil 36 through a pair of wires 38 which enter the assembly through a grommet 40, the disk 2' moves to its upward position. The magnetostrictive action is also reinforced by the direct magnetic attraction of the disk to the center pole piece 35.

Figure 8:
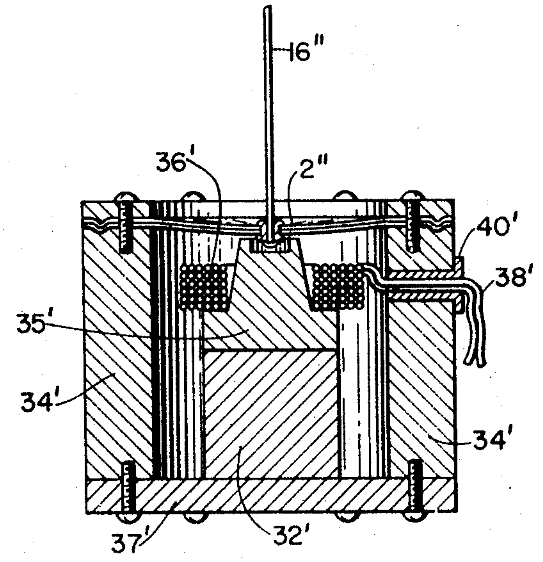

Another embodiment of the invention is shown in FIG. 8. This embodiment is similar to that shown in FIG. 7 in that a permanent magnet 32' with pole pieces 34' and 35' is employed in conjunction with a de-magnetizing coil 36'. In the embodiment of FIG. 8 the magnetic material 32' is cylindrically-shaped and provides axial magnetization. The assembly is mounted on a base 37' of iron or other magnetizable material.

In the embodiments of FIGS. 7 and 8, the axial displacement of the center of the disk is about .008 inch for a 1" disk having a layer of a cold rolled 70% cobalt and 30% iron compound and a layer of nickel, with a magnetic field of about 1000 oersteds.

Using the method of calculation shown above with the subtended angle $2\theta=2\times 6\times \delta e/e$ at 1000 oersteds the values of $\delta e/e$, are as follows:

For 70% cobalt 30% iron $$\delta e/e=126\times 10^{-6}$$

and for nickel $$\delta e/e=37\times 10^{-6}$$

providing a total change $$\Sigma\delta e/e=163\times 10^{-6}$$

Thus $$\theta=\sqrt{6\times 163\times 10^{-6}}=.0312 \text{ radians}=1.78^\circ$$

corresponding to an axial shift $$a=R(1-\cos\theta)=2R\times\sin^2\frac{\theta}{2}=2R\left(\frac{\theta}{2}\right)^2$$

for small values of $\theta$.

For $e=1''$, $$R=\frac{e}{2\theta}=\frac{1}{2\times .0312}=16 \text{ inches}$$

and $$a=2\times 16\left(\frac{.0312}{2}\right)=.0078''$$

The control devices shown in FIGS. 7 and 8 can be used in the apparatus of FIGS. 5 and 6 or in any of the above-described applications.

In addition to the several embodiments of the invention which have been shown and described above, other embodiments can obviously be made. For example, the magnetic field established by the coils in the various embodiments of the invention can be alternatively established by passing an electric current through the magnetostrictive material itself. As a further embodiment, an electromechanical bistable device can be fabricated by employing two oppositely-oriented control mechanisms at opposite ends of a single rod 16 (FIG. 1). In this case, activation of one control device causes the disk to move from a first position to a second position where it remains until the second control device is activated. In turn, activation of the second control device returns the disk to its first position where it remains until the first control device is again activated.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electro-mechanical switch comprising, in combination:

a control element comprising at least one material having a non-zero magnetostrictive coefficient of expansion;

means for mounting the control element in a prestressed condition to force said element to assume a non-planar state of quiescent equilibrium;

and means for selectively establishing a magnetic field in the control element to vary the dimension of the control;

element for selectively generating a displacing force, said force overcoming the force of said prestress to drive said element through the planar state to a second non-planar state, which second state is sustained by the continued application of said magnetic field.

2. The device described in claim 1, wherein the control element is multi-layered, comprising at least two layers having different magnetostrictive coefficients of expansion.

3. The device described in claim 2, wherein one layer has a positive magnetostrictive coefficient of expansion and another layer has a negative magnetostrictive coefficient of expansion.

4. The device described in claim 3, wherein one layer is a cold-rolled iron cobalt compound and the other layer comprises nickel.

5. The device described in claim 1, wherein the control element is disk shaped and the magnetic field means is a coil arranged adjacent to the control element with the axis of the coil intercepting the center of the disk.

6. An electro-mechanical switch comprising, in combination:

a control element comprising at least one material having a non-zero magnetostrictive coefficient of expansion;

means for mounting the control element in a prestressed, non-planar first position such that forcible displacement of the element transfers the element from said first position to a second non-planar position through a planar position according to a force-displacement relationship having a negative resistance characteristic between said planar and said second positions;

and means for selectively establishing a magnetic field in the control element to magnetostrictively vary the dimension of the control element for selectively generating a force that is at least equal to the force required to displace the control element from said first position into the negative resistance displacement range.

7. The device described in claim 6, wherein the control element is multi-layered, comprising at least two layers having different magnetostrictive coefficients of expansion.

8. The device described in claim 7, wherein one layer has a positive magnetostrictive coefficient of expansion and another layer has a negative magnetostrictive coefficient of expansion.

9. The device described in claim 8, wherein one layer is a cold-rolled cobalt-iron compound and the other layer comprises nickel.

10. The device described in claim 6, wherein the control element is disk shaped and the magnetic field means is a coil arranged adjacent to the control element with the axis of the coil intercepting the control of the disk.

11. A hammer mechanism for use in a printing machine comprising in combination:

a frame;

a flexible hammer beam with one end rigidly attached to the frame for storing the energy required for printing when flexed;

a hammer head mounted on the other end of the hammer beam;

means for biasing the hammer beam by flexure to store the needed printing energy and for holding it in this position, said means including a magnetostrictive element;

and means for counteracting the biasing means, causing the hammer beam to be released to effect printing, said means including an electromagnetic structure to change the magnetization in said magnetostrictive element, causing a dimensional change sufficient to release said hammer beam.

12. A magnetostrictive actuator comprising, in combination:

a control element including at least one layer of magnetostrictive material;

means for mounting said element in a prestressed first state to force said layer to conform to a first radius of curvature; and selectively operable magnetic means, including a pole piece positioned adjacent the center of said element, for applying a magnetic field to said element to magnetostrictively drive said element from said first state through the planar state to a state of reverse curvature, the force of magnetostrictive action combined with the force of attraction of said pole piece being sufficient to maintain said element in said state of reverse curvature against the bias of said prestress.

13. The actuator set forth in claim 1 wherein said control element comprises:

a circular diaphragm including two magnetostrictive layers having different co-efficients of magnetostrictive expansion, said diaphragm being held in said prestressed first state by an annular ring mounted about the periphery of said diaphragm to maintain said diaphragm in a state of uniform radical compression.

References Cited

UNITED STATES PATENTS

| | | | |
|---|---|---|---|
| 1,889,153 | 11/1932 | Pierce | 310—26 X |
| 2,441,158 | 5/1948 | Krasnow | 310—26 X |
| 2,445,318 | 7/1948 | Eldredge et al. | 310—26 |
| 2,619,604 | 11/1952 | Burns | 310—26 |
| 2,714,642 | 8/1955 | Kingsley | 200—181 |
| 2,835,761 | 5/1958 | Crownover | 200—181 |
| 2,927,255 | 3/1960 | Diesel | 200—181 |
| 3,072,045 | 1/1963 | Goin | 101—93 |
| 3,117,256 | 1/1964 | Gamblin | 101—1 |
| 3,151,543 | 10/1964 | Preisinger | 101—93 |
| 3,233,540 | 2/1966 | Grottrup | 101—93 |

FOREIGN PATENTS 752,317 7/1956 Great Britain.

WILLIAM B. PENN, Primary Examiner

U.S. Cl. X.R.

200—181; 310—26; 317—143; 318—118; 335—215